(12) United States Patent
Xue et al.

(10) Patent No.: US 11,382,059 B2
(45) Date of Patent: Jul. 5, 2022

(54) METHOD AND DEVICE FOR SENDING POSITIONING SIGNAL

(71) Applicant: HUAWEI TECHNOLOGIES CO., LTD., Shenzhen (CN)

(72) Inventors: Jiantao Xue, Beijing (CN); Jing Han, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 16/834,761

(22) Filed: Mar. 30, 2020

(65) Prior Publication Data

US 2020/0229128 A1    Jul. 16, 2020

Related U.S. Application Data

(63) Continuation of application No. PCT/CN2018/108402, filed on Sep. 28, 2018.

(30) Foreign Application Priority Data

Sep. 30, 2017   (CN) .......................... 201710923314.2

(51) Int. Cl.
   *H04W 64/00*   (2009.01)
   *H04W 48/18*   (2009.01)

(52) U.S. Cl.
   CPC ......... *H04W 64/003* (2013.01); *H04W 48/18* (2013.01)

(58) Field of Classification Search
   CPC ... H04W 64/003; H04W 48/18; H04W 76/16; H04W 64/00; H04W 88/06; H04W 40/12; H04W 24/10; H04W 36/0085; H04W 36/08; H04W 36/00; H04W 36/0083; H04W 12/63; H04B 17/309; H04B 17/382; H04B 17/318
   See application file for complete search history.

(56) References Cited

U.S. PATENT DOCUMENTS

| | | | |
|---|---|---|---|
| 2008/0089312 A1* | 4/2008 | Malladi | ............... H04L 27/2613 370/345 |
| 2012/0083278 A1 | 4/2012 | Kazmi et al. | |
| 2012/0184302 A1 | 7/2012 | Kazmi et al. | |
| 2014/0022454 A1* | 1/2014 | Oh | ..................... H04N 21/4307 348/515 |

(Continued)

FOREIGN PATENT DOCUMENTS

| | | |
|---|---|---|
| CN | 102098781 A | 6/2011 |
| CN | 103582115 A | 2/2014 |

(Continued)

OTHER PUBLICATIONS

Office Action dated Mar. 19, 2020 from corresponding application No. CN 201710923314.2.

(Continued)

*Primary Examiner* — Fred A Casca
(74) *Attorney, Agent, or Firm* — Hauptman Ham, LLP

(57) ABSTRACT

A method for sending a positioning signal includes determining, by a first device, a first target access network useable to transmit the positioning signal. The first target access network includes at least a first access network or a second access network. The method further includes sending, by the first device, the positioning signal to a second device by the first target access network.

19 Claims, 9 Drawing Sheets

(56) References Cited

U.S. PATENT DOCUMENTS

| | | | |
|---|---|---|---|
| 2014/0073356 A1 | 3/2014 | Siomina et al. | |
| 2015/0038140 A1* | 2/2015 | Kilpatrick, II | H04W 72/02 |
| | | | 455/436 |
| 2017/0222889 A1* | 8/2017 | Zong | H04L 41/5051 |
| 2017/0234978 A1* | 8/2017 | Shvodian | H04B 7/18513 |
| | | | 455/522 |
| 2017/0347332 A1 | 11/2017 | Cui et al. | |
| 2018/0199170 A1* | 7/2018 | Mannbar | H04L 12/4625 |
| 2020/0204317 A1* | 6/2020 | Kim | H04W 4/029 |

FOREIGN PATENT DOCUMENTS

| | | |
|---|---|---|
| CN | 103609196 A | 2/2014 |
| CN | 105744618 A | 7/2016 |
| WO | 2016131165 A1 | 8/2016 |

OTHER PUBLICATIONS

Intel Corporation, "Motivation for SI: Study on NR Positioning Support", 3GPP TSG RAN Meeting #77, RP-171815, Sapporo, Japan, Sep. 11-14, 2017, total 11 pages.

Chinese Second Office Action issued in corresponding Chinese Application No. 201710923314.2, dated Jul. 29, 2020, State Intellectual Property Office of People's Republic of China, Beijing, China.

Extended European Search Report issued in corresponding European Application No. 18862703.8, dated Aug. 27, 2020, pp. 1-8, European Patent Office, Munich, Germany.

* cited by examiner

METHOD AND DEVICE FOR SENDING POSITIONING SIGNAL

CROSS-REFERENCE TO RELATED APPLICATIONS

This application is a continuation of International Application No. PCT/CN2018/108402, filed on Sep. 28, 2018, which claims priority to Chinese Patent Application No. 201710923314.2, filed on Sep. 30, 2017. The disclosures of the aforementioned applications are hereby incorporated by reference in their entireties.

TECHNICAL FIELD

This application relates to the field of wireless communications technologies, and in particular, to a method and a device for sending a positioning signal.

BACKGROUND

With development of communication services, a positioning service plays an important role as an indispensable part of mobile communication and personal communication services. With support of an electronic map platform, the positioning service is a value-added service that can provide a corresponding service for a mobile terminal user by obtaining position information (such as latitude and longitude coordinates) of the user through a network of a telecommunication mobile operator. A time difference of arrival (time different of arrival, TDOA)-based positioning algorithm is an important algorithm that implements the positioning service. The principle is: when there are three or more base stations in a system, a positioning server can use time differences of downlink/uplink reference signals of different base stations to determine a position of user equipment (user equipment, UE).

In an actual application, in a process of using the TDOA-based positioning algorithm to implement UE positioning, a plurality of positioning signals, for example, a positioning request signal and a neighbor base station list signal, are required to be transmitted between the positioning server and the UE. In a 4th generation mobile system long term evolution (long term evolution, LTE) network, the LTE network is a single access network, and each UE is connected to only one access network. Correspondingly, when using the TDOA-based algorithm to implement UE positioning, the UE only needs to use the connected single access network to transmit the positioning signals. In a scenario in which the UE is connected to a plurality of access networks, there is currently no related solution about how to send the positioning signals.

SUMMARY

Embodiments of this application provide a method and a device for sending a positioning signal, to determine a target access network for sending the positioning signal when UE maintains a connected state with two access networks.

According to a first aspect, an embodiment of this application provides a method for sending a positioning signal. The method includes: determining, by a first device, a first target access network used to transmit a positioning signal, where the first target access network includes at least one of a first access network and a second access network: and sending, by the first device, the positioning signal to a second device by using the first target access network.

In a possible design, the first device is a terminal device, the second device is a network device, and the terminal device maintains a connected state with the first access network and the second access network; or the first device is a network device, the second device is a terminal device, and the terminal device maintains a connected state with the first access network and the second access network. It can be learned that when a terminal device maintains a connected state with two access networks, an access network can be relatively properly selected to send a positioning signal, thereby reducing positioning duration.

In a possible design, the determining, by a first device, a first target access network used to transmit a positioning signal includes:

determining, by the first device when the first access network or the second access network satisfies a first condition, that the first target access network is the first access network or the second access network: and determining, by the first device when neither of the first access network and the second access network satisfies the first condition, that the first target access network is the first access network and the second access network, where the first condition includes at least one of: channel quality of an access network being greater than a first preset value, load of the access network being less than a second preset value, and a throughput of the access network being less than a third preset value. It can be learned that by using the method in this application, it can be ensured that quality of an access network for sending a positioning signal is relatively good, which can improve positioning accuracy, reduce the impact of positioning on data traffic, reduce power consumption of a terminal device, reduce spectrum occupation of a positioning reference signal, and so on.

In a possible design, the determining, by a first device, a first target access network used to transmit a positioning signal includes: determining, by the first device, the first target access network based on preconfiguration. It can be learned that the first device directly determines an access network for transmitting the positioning signal based on preconfiguration, so that the first device does not need to select the access network, thereby reducing positioning duration.

In a possible design, the positioning signal includes a positioning reference signal used for positioning measurement, and the sending, by the first device, the positioning signal to a second device by using the first target access network includes: sending, by the first device, the positioning reference signal to the second device by using first duration as a period and by using the first access network when the first target access network is the first access network, where a bandwidth for sending the positioning reference signal is a first bandwidth; and/or sending, by the first device, the positioning reference signal to the second device by using second duration as a period and by using the second access network when the first target access network is the second access network, where a bandwidth for sending the positioning reference signal is a second bandwidth.

In a possible design, the positioning signal is control signaling used for positioning, or the positioning signal is a signal used for positioning measurement.

According to a second aspect, an embodiment of this application provides method for receiving a positioning signal. The method includes: receiving, by a second device, a positioning signal sent by a first device through a first target access network, where the first target access network is at least one of the first access network and the second access network; and performing, by the second device, corresponding processing on the positioning signal.

In a possible design, the first device is a terminal device, the second device is a network device, and the terminal device maintains a connected state with the first access network and the second access network: or the first device is a network device, the second device is a terminal device, and the terminal device maintains a connected state with the first access network and the second access network.

In a possible design, when the first access network or the second access network satisfies a first condition, the first target access network is the first access network or the second access network; and when neither of the first access network and the second access network satisfies the first condition, the first target access network is the first access network and the second access network, where the first condition includes at least one of: channel quality of an access network being greater than a first preset value, load of the access network being less than a second preset value, and a throughput of the access network being less than a third preset value.

In a possible design, the first target access network is determined based on preconfiguration.

In a possible design, the positioning signal is control signaling used for positioning, or the positioning signal is a signal used for positioning measurement.

In a possible design, when the first target access network includes the first access network and the second access network, and the positioning signal is a positioning reference signal used for positioning measurement, the performing, by the second device, corresponding processing on the positioning signal includes: determining, by the second device, a second target access network used to receive the positioning reference signal, where the second target access network includes at least one of the first access network and the second access network: receiving, by the second device through the second target access network, the positioning reference signal sent by the first device: and obtaining, by the second device, a positioning measurement result based on the received positioning reference signal.

In a possible design, when the second target access network includes the first access network and the second access network, the first access network corresponds to a first positioning reference signal, and the second access network corresponds to a second positioning reference signal, the obtaining, by the second device, a positioning measurement result based on the received positioning reference signal includes: performing, by the second device, joint detection on the first positioning reference signal and the second positioning reference signal when the first positioning reference signal and the second positioning reference signal satisfy a second condition, to obtain the positioning measurement result; and detecting, by the second device, the first positioning reference signal and the second positioning reference signal respectively when the first positioning reference signal and the second positioning reference signal do not satisfy the second condition, to obtain the positioning measurement result, where the second condition includes at least one of: phase of the first positioning reference signal and the second positioning reference signal being continuous and the first positioning reference signal and the second positioning reference signal being synchronous. It can be learned that the second device can freely select an access network for receiving a reference signal, so that when an access network fails, positioning measurement can be successful by using another access network, which can increase a success rate of positioning measurement.

In a possible design, the positioning measurement result includes a first positioning measurement result and a second positioning measurement result, and the obtaining, by the second device, a positioning measurement result based on the received positioning reference signal includes: obtaining, by the second device, the first positioning measurement result based on the first positioning reference signal and obtaining the second positioning measurement result based on the second positioning reference signal when detecting the first positioning reference signal and the second positioning reference signal respectively.

In a possible design, the first device is a terminal device, the second device is a network device, and the method further includes: reporting, by the terminal device, the first measurement result and the second measurement result to the network device.

In a possible design, the obtaining, by the second device, a positioning measurement result based on the received positioning reference signal includes: obtaining, by the second device, a first positioning measurement result based on the first positioning reference signal and obtaining a second positioning measurement result based on the second positioning reference signal when detecting the first positioning reference signal and the second positioning reference signal respectively; and obtaining, by the second device, the positioning measurement result based on the first positioning measurement result and the second positioning measurement result. It can be learned that in the embodiments of this application, instead of calculating a final positioning measurement result, the terminal device reports the first positioning measurement result and the second positioning measurement result to a base station for calculation, thereby reducing positioning power consumption of the terminal device.

In a possible design, the obtaining, by the second device, a positioning measurement result based on the received positioning reference signal includes: combining, by the second device, the first positioning reference signal and the second positioning reference signal when performing joint detection on the first positioning reference signal and the second positioning reference signal, to obtain a combined positioning reference signal: obtaining, by the second device, a local positioning reference signal; and obtaining, by the second device, the positioning measurement result based on the combined positioning reference signal and the local positioning reference signal. It can be learned that the terminal device only needs to report one positioning measurement result. Compared with reporting two positioning measurement results, reporting power of UE is reduced.

In a possible design, the first device is a terminal device, the second device is a network device, and the method further includes: reporting, by the terminal device, the measurement result to the network device.

According to a third aspect, an embodiment of this application provides a device for sending a positioning signal. The device for sending a positioning signal includes: a processor, configured to determine a first target access network used to transmit a positioning signal, where the first target access network includes at least one of a first access network and a second access network: and a transceiver, configured to send the positioning signal to a second device by using the first target access network.

In a possible design, the device is a terminal device or is located on a terminal device side, the second device is a network device or is located on a network device side, and the device maintains a connected state with the first access network and the second access network; or the device for sending the positioning signal is a network device or is located on a network device side, the second device is a terminal device or is located on a terminal device side, and the second device maintains a connected state with the first access network and the second access network.

In a possible design, when determining the first target access network used to transmit the positioning signal, the processor is specifically configured to: determine, when the first access network or the second access network satisfies a first condition, that the first target access network is the first access network or the second access network; and determine, when neither of the first access network and the second access network satisfies the first condition, that the first target access network is the first access network and the second access network, where the first condition includes at least one of: channel quality of an access network being greater than a first preset value, load of the access network being less than a second preset value, and a throughput of the access network being less than a third preset value.

In a possible design, when determining the first target access network used to transmit the positioning signal, the processor is specifically configured to: determine the first target access network based on preconfiguration.

In a possible design, the positioning signal includes a positioning reference signal used for positioning measurement, and when sending the positioning signal to the second device by using the first target access network, the transceiver is specifically configured to: send the positioning reference signal to the second device by using first duration as a period and by using the first access network when the first target access network is the first access network, where a bandwidth for sending the positioning reference signal is a first bandwidth; and/or send the positioning reference signal to the second device by using second duration as a period and by using the second access network when the first target access network is the second access network, where a bandwidth for sending the positioning reference signal is a second bandwidth.

In a possible design, the positioning signal is control signaling used for positioning, or the positioning signal is a signal used for positioning measurement.

According to a fourth aspect, an embodiment of this application provides a device for receiving a positioning signal. The device for receiving a positioning signal includes: a transceiver, configured to receive a positioning signal sent by a first device through a first target access network, where the first target access network is at least one of the first access network and the second access network and a processor, configured to perform corresponding processing on the positioning signal.

In a possible design, the first device is a terminal device or is located on a terminal device side, the device for receiving the positioning signal is a network device or is located on a network device side, and the first device maintains a connected state with the first access network and the second access network; or the first device is a network device, the device for receiving the positioning signal is a terminal device or is located on a terminal device side, and the device for receiving a positioning reference signal maintains a connected state with the first access network and the second access network.

In a possible design, when the first access network or the second access network satisfies a first condition, the first target access network is the first access network or the second access network; and when neither of the first access network and the second access network satisfies the first condition, the first target access network is the first access network and the second access network, where the first condition includes at least one of: channel quality of an access network being greater than a first preset value, load of the access network being less than a second preset value, and a throughput of the access network being less than a third preset value.

In a possible design, the first target access network is determined by the first device based on preconfiguration.

In a possible design, the positioning signal is control signaling used for positioning, or the positioning signal is a signal used for positioning measurement.

In a possible design, when the first target access network includes the first access network and the second access network, and the positioning signal is a positioning reference signal used for positioning measurement, and when performing corresponding processing on the positioning signal, the processor is specifically configured to: determine a second target access network used to receive the positioning reference signal, where the second target access network includes at least one of the first access network and the second access network; receive, through the second target access network, the positioning reference signal sent by the first device: and obtain a positioning measurement result based on the received positioning reference signal.

In a possible design, when the second target access network includes the first access network and the second access network, the first access network corresponds to a first positioning reference signal, and the second access network corresponds to a second positioning reference signal, and when obtaining the positioning measurement result based on the received positioning reference signal, the processor is specifically configured to: perform joint detection on the first positioning reference signal and the second positioning reference signal when the first positioning reference signal and the second positioning reference signal satisfy a second condition, to obtain the positioning measurement result: and detect the first positioning reference signal and the second positioning reference signal respectively when the first positioning reference signal and the second positioning reference signal do not satisfy the second condition, to obtain the positioning measurement result, where the second condition includes at least one of: phase of the first positioning reference signal and the second positioning reference signal being continuous and the first positioning reference signal and the second positioning reference signal being synchronous.

In a possible design, the positioning measurement result includes a first positioning measurement result and a second positioning measurement result, and when obtaining the positioning measurement result based on the received positioning reference signal, the processor is specifically configured to: obtain the first positioning measurement result based on the first positioning reference signal and obtain the second positioning measurement result based on the second positioning reference signal when detecting the first positioning reference signal and the second positioning reference signal respectively.

In a possible design, the transceiver is further configured to report the first measurement result and the second measurement result to the network device.

In a possible design, when obtaining the positioning measurement result based on the received positioning reference signal, the processor is specifically configured to: obtain a first positioning measurement result based on the first positioning reference signal and obtain a second positioning measurement result based on the second positioning reference signal when detecting the first positioning reference signal and the second positioning reference signal respectively; and obtain the positioning measurement result based on the first positioning measurement result and the second positioning measurement result.

In a possible design, when obtaining the positioning measurement result based on the received positioning reference signal, the processor is specifically configured to: combine the first positioning reference signal and the second positioning reference signal when performing joint detection on the first positioning reference signal and the second positioning reference signal, to obtain a combined positioning reference signal: obtain a local positioning reference signal; and obtain the positioning measurement result based on the combined positioning reference signal and the local positioning reference signal.

In a possible design, the transceiver is further configured to report the measurement result to the network device.

According to a fifth aspect, an embodiment of this application further provides a computer-readable storage medium, including an instruction, where when run on a communications device, the instruction enables the communications device to perform the method according to any one of the foregoing aspects.

According to a sixth aspect, an embodiment of this application further provides a chip. The chip is connected to a memory, and is configured to read and execute a software program stored in the memory, to implement the method according to any one of the foregoing aspects.

According to a seventh aspect, an embodiment of this application further provides an apparatus, including a processor and a memory, where the memory stores a program or an instruction, and when the program or the instruction is executed by the processor, the method according to any one of the foregoing aspects is implemented.

In summary, in the embodiments of this application, the first device can determine a target access network, and send the positioning signal to the second device through the first target access network, where the first target access network is at least one of the first access network and the second access network. It can be learned that in the embodiments of this application, when the first device or the second device maintains a connected state with two access networks, a target access network for sending the positioning signal may be determined.

DESCRIPTION OF EMBODIMENTS

Figure 1A:
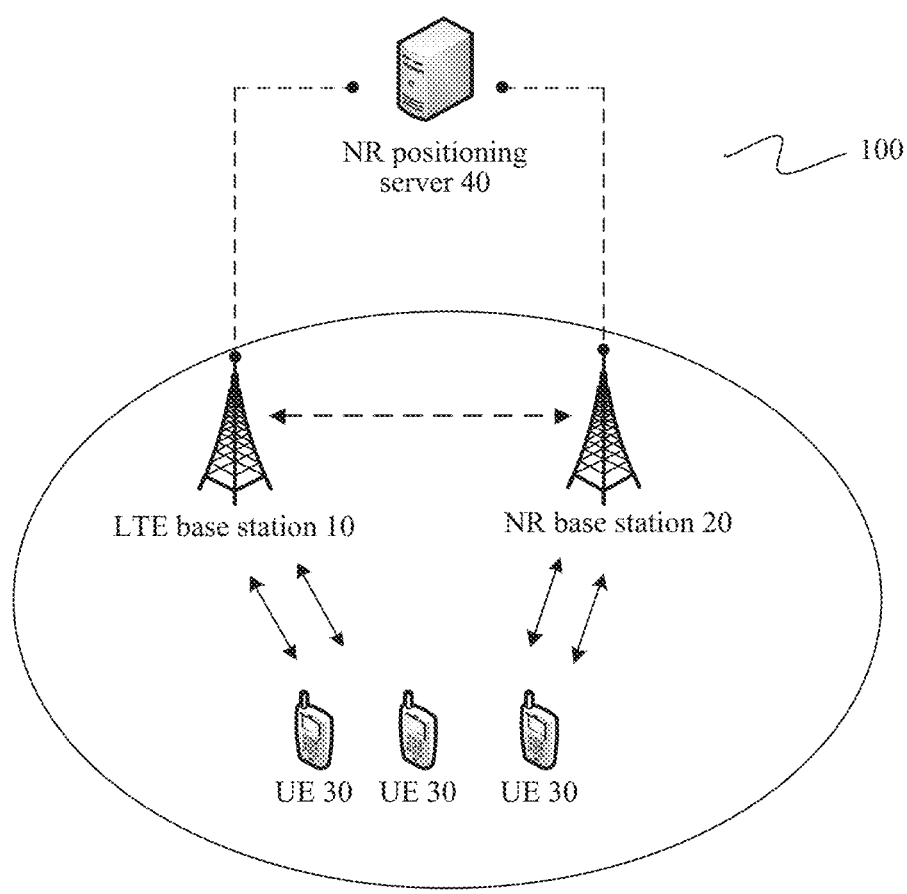
FIG. 1A and FIG. 1B are schematic diagrams of a communications system according to an embodiment of this application.

For ease of understanding, examples of descriptions of concepts related to the embodiments of this application are provided as follows for reference:

A positioning server is a network element in a core network (core network, CN), and is mainly configured to control positioning measurement performed on UE, for example, configure a neighboring cell measurement list of the UE and control a base station to deliver a positioning measurement signal by using auxiliary data or control the UE to transmit a positioning measurement signal by using auxiliary data. In the embodiments of this application, for example, the base station may be a Node B in a UMTS system, and the positioning server may be a network controller. For another example, the base station may be a small cell, and the positioning server may be a macro base station that covers the small cell. For still another example, the positioning server may be an inter-standard coordination controller in a wireless network, and the base station is a base station in the wireless network. This is not limited in the embodiments of this application. For ease of description, in the embodiments of this application, a network element that implements positioning measurement of the UE is referred to as the positioning server.

A positioning signal mainly includes two types, which are respectively a signal used for positioning measurement (for example, a PRS and an SRS) and signaling used for positioning (for example, in downlink, the signaling may specifically be positioning auxiliary information and positioning configuration information, and in uplink, the signaling may specifically a positioning report and a positioning request).

A time difference of arrival (time different of arrival, TDOA)-based positioning method is mainly a method that completes measurement based on a time difference of arrival of signals. The principle is mainly that when there are three or more base stations in a system, the positioning server can use time differences of downlink/uplink reference signals of different base stations to determine a position of the UE. Specifically, depending on whether an uplink reference signal or a downlink reference signal is used for positioning measurement, there are an uplink time difference of arrival (uplink time different of arrival, UTDOA) positioning technology and a downlink time difference of arrival (downlink time different of arrival, DTDOA) positioning technology.

A dual connectivity (dual connectivity, DC) state of the UE means that the UE can maintain a connected state with at least two access networks. In this state, the UE can select one access network from two access networks to transmit uplink data, or transmit uplink data by using both two access networks. In the embodiments of this application, types of two access networks with which the UE maintains a connected state may be the same and may be different. For example, the UE can maintain a connected state with two LTE access networks, or maintain a connected state with two NR access networks, or the UE maintains a connected state with an LTE access network and an NR access network respectively.

A serving base station is a base station that provides a service for the UE, for example, an LTE base station or an NR base station. In the embodiments of this application, when the UE is in the DC state, the UE may have a plurality of serving base stations, for example, the NR base station and the LTE base station, which can provide the service for the UE together. Moreover, when being in the dual connectivity state, the UE maintains a connected state with access networks corresponding to the plurality of serving base stations of the UE.

The following clearly describes the technical solutions in the embodiments of this application with reference to the accompanying drawings in the embodiments of this application.

Figure 1B:
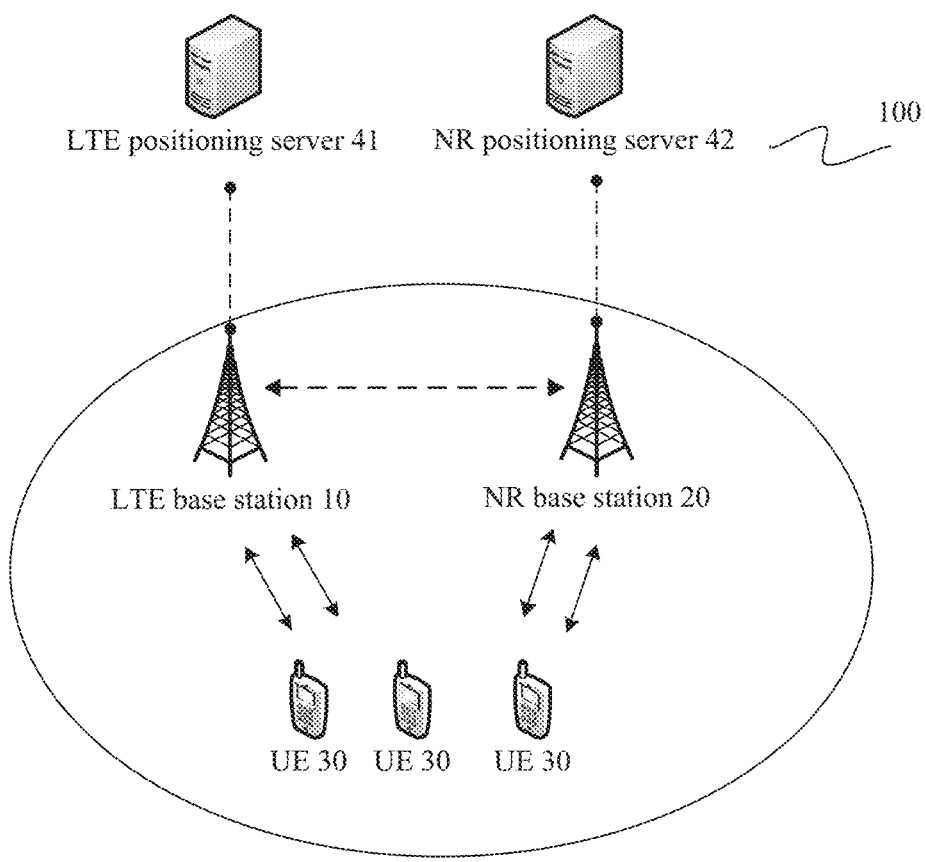

As shown in FIG. 1A or FIG. 1B, the embodiments of this application provide a communications system 100, where the communications system 100 includes a long term evolution (long term evolution, LTE) base station 10, a new radio (new radio, NR) base station 20, and UEs 30. Being in the dual connectivity (dual connectivity. DC) state, the UEs 30 maintain a connected state with two access networks, which are respectively an access network corresponding to an LTE base station 10 and an access network corresponding to an NR base station 20. For ease of description, the access network corresponding to the LTE base station 10 may be referred to as a first access network, and the access network corresponding to the NR base station 20 is referred to as a second access network.

In the embodiments of this application, when the communications system is applied to a positioning service of the UEs 30, the communications system 100 may further include a positioning server, where the positioning server may specifically be a network element in a core network. As shown in FIG. 1A, the communications system 100 may include a positioning server 40, where the positioning server corresponds to two networks, that is, an LTE network and an NR network. Alternatively, as shown in FIG. 1B, the communications system may include two positioning servers, which are respectively an LTE positioning server 41 and an NR positioning server 42. The LTE positioning server 41 corresponds to an LTE network, and the NR positioning server 42 corresponds to an NR network.

In the embodiments of this application, the UEs 30 may include various handheld devices, vehicle-mounted devices, wearable devices, or computing devices that have a wireless communication function, or other processing devices connected to a wireless modem. The UE may also be referred to as a mobile station (mobile station, MS for short), a terminal (terminal), and terminal device (terminal equipment), and may also include a subscriber unit (subscriber unit), a cellular phone (cellular phone), a smart phone (smart phone), a wireless data card, a personal digital assistant (personal digital assistant. PDA) computer, a tablet computer, a wireless modem (modem), a handheld device (handheld), a laptop computer (laptop computer), a cordless phone (cordless phone) or a wireless local loop (wireless local loop, WLL) station, a machine type communication (machine type communication, MTC) terminal, and the like. For ease of description, in all the embodiments of this application, the devices mentioned above are collectively referred to as UE.

In the embodiments of this application, the LTE base station mainly refers to an apparatus that provides a wireless communication function for the UEs 30 in the LTE network, and the NR base station mainly refers to an apparatus that provides the wireless communication function for the UEs 30 in the NR network. The LTE base station and the NR base station may include a macro base station, a micro base station (which is also referred to as a small cell), a relay station, an access point, and the like in various forms. In systems using different wireless access technologies, a device having a base station function may be named differently.

In the embodiments of this application, the communications system 100 may be various radio access technology (radio access technology, RAT) systems, for example, code division multiple access (code division multiple access, CDMA), time division multiple access (time division multiple access, TDMA), frequency division multiple access (frequency division multiple access, FDMA), orthogonal frequency-division multiple access (orthogonal frequency-division multiple access. OFDMA), single carrier frequency-division multiple access (single carrier FDMA, SC-FDMA), and another system. The term "system" can be mutually changed with "network". The CDMA system can implement wireless technologies such as universal terrestrial radio access (universal terrestrial radio access, UTRA) and CDMA2000. The UTRA may include a wideband CDMA (wideband CDMA. WCDMA) technology and another technology from CDMA deformation. The CDMA2000 may cover interim standard (interim standard, IS) 2000 (IS-2000), IS-95, and IS-856. The TDMA system can implement wireless technologies such as global system for mobile communications (global system for mobile communication, GSM). The OFDMA system can implement wireless technologies such as evolved universal terrestrial radio access (evolved UTRA, E-UTRA), ultra mobile broadband (ultra mobile broadband, UMB), IEEE 802.11 (Wi-Fi), IEEE 802.16 (WiMAX), IEEE 802.20, and Flash OFDMA. UTRA and E-UTRA are the UMTS and an evolved version of the UMTS. A new version of the UMTS, namely, E-UTRA, is used in 3GPP long term evolution (long term evolution, LTE) and various versions evolved based on LTE. Moreover, the communications system may further be applicable to a future-oriented communications technology. Provided that in a communications system for which a new communications technology is used, when the UE is in the dual connectivity state, information is required to be transmitted between the UE and a base station, the communications system is applicable to the technical solutions provided in the embodiments of this application. A system architecture and service scenarios described in the embodiments of this application aim to more clearly describe the technical solutions in the embodiments of this application, but are not construed as limitations to the technical solutions provided in the embodiments of this application. A person of ordinary skill in the art may know that as the network architecture evolves and a new service scenario emerges, the technical solutions provided in the embodiments of this application are further applicable to a similar technical problem.

It should be noted that, quantities and types of UEs, LTE base stations, NR base stations, and positioning servers that are included in the communications system 100 shown in FIG. 1A or FIG. 1B are merely examples. The embodiments of this application are not limited thereto. For example, the communications system 100 may further include more UEs that communicate with the base station. For ease of description, the UEs are not described one by one in the accompanying drawings. Moreover, in the communications system 100 shown in FIG. 1A or FIG. 1B, although the base station, the UEs, and the positioning server are shown, the communications system 100 may not be limited to include only the base station, the UEs, and the positioning server. For example, the communications system 100 can include a network element of another core network to implement a function of positioning the UEs. This is obvious for a person of ordinary skill in the art. Details are not described herein again.

In the embodiments of this application, in a process of using the time difference of arrival (time different of arrival, TDOA)-based positioning algorithm to implement UE positioning, a plurality of positioning signals, for example, a positioning request signal and a neighbor base station list signal, are required to be transmitted between the positioning server and the UEs. A method provided in the embodiments of this application is mainly used to resolve how to use two access networks to transmit the positioning signals when the UE is in the DC state and is connected to two access networks.

It should be noted that, in 5th generation mobile communication system new radio (new radio, NR), a none standalone scenario is proposed. The none standalone scenario means that the NR network depends on deployment of the LTE network, and each UE is connected to two access networks, where the two access networks are respectively the LTE access network and the NR access network. A method for sending a positioning signal that is provided in the embodiments of this application may be applied to the none standalone scenario, but is not limited to be applied to the none standalone scenario. For example, the method for sending a positioning signal that is provided in the embodiments of this application may also be applied to a scenario in which the UE is connected to the LTE access network, or the UE is connected to two RN access networks.

Figure 2:
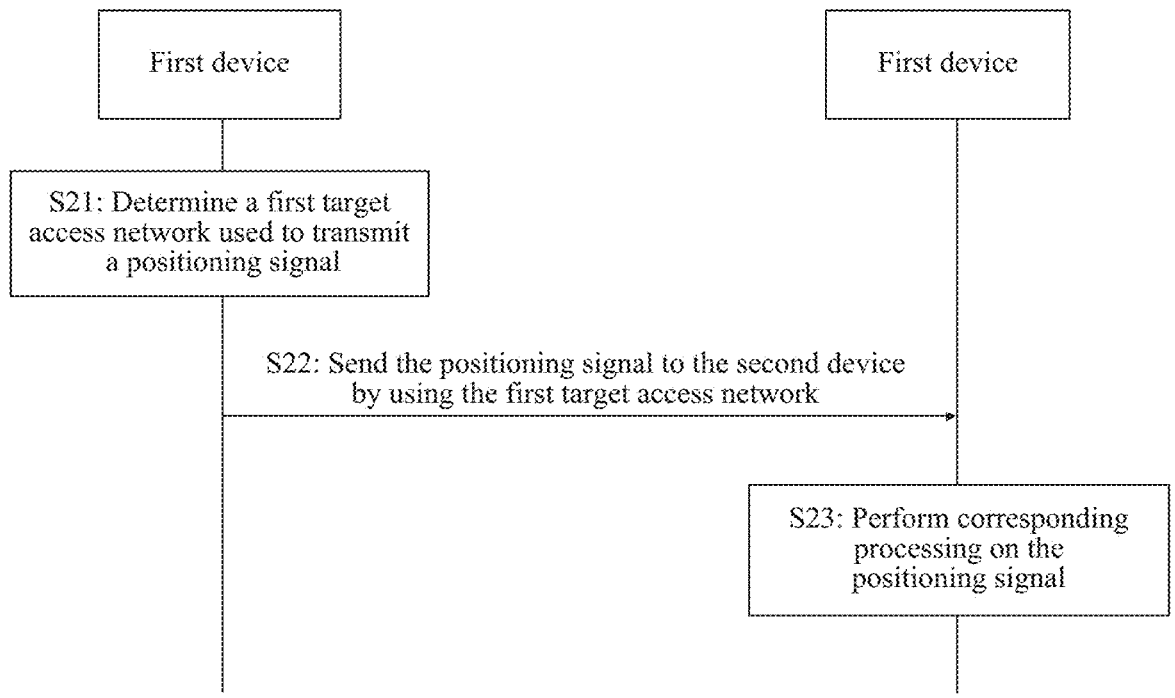
FIG. 2 to FIG. 6 are flowcharts of sending a positioning signal according to an embodiment of this application.

FIG. 2 shows a procedure of sending a positioning signal according to an embodiment of this application. A first device in the procedure may correspond to the UE 30 in FIG. 1A or FIG. 1B, and a second device may correspond to the base station in FIG. 1A or FIG. 1B (for example, the NR base station 10 or the LTE base station 20 in FIG. 1A or FIG. 1B): or a second device in the procedure may correspond to the UE 30 in FIG. 1A or FIG. 1B, and a first device may correspond to the base station in FIG. 1A or FIG. 1B (for example, the NR base station 10 or the LTE base station 20 in FIG. 1A or FIG. 1B). As shown in FIG. 2, the procedure may specifically include:

Step S21. The first device determines a first target access network used to transmit a positioning signal, where the first target access network may include at least one of a first access network and a second access network. For example, the first target access network may specifically be the first access network, or the first access network may specifically be the second access network, or the first target access network may specifically be the first access network and the second access network.

In this embodiment of this application, the first device may determine the first target access network based on different criteria. For example, in an example, the first device may determine, when the first access network or the second access network satisfies a first condition, that the first target access network is the first access network or the second access network: and the first device determines, when neither of the first access network and the second access network satisfies the first condition, that the first target access network is the first access network and the second access network, where the first condition includes one or more of: channel quality of an access network being greater than a first preset value, load of the access network being less than a second preset value, and a throughput of the access network being less than a third preset value.

For another example, the first device may determine the first target access network based on preconfiguration, where the preconfiguration is also pre-agreed by a protocol. For example, the protocol may pre-agree to transmit the positioning signal through the first access network, so that the first target access network may specifically be the first access network. For example, the protocol may also predetermine to preferentially use the second access network to transmit the positioning signal, so that the first device preferentially uses the second access network to transmit the positioning signal when the second access network has a remaining capacity.

Step S22. The first device sends the positioning signal to the second device by using the first target access network.

In this embodiment of this application, when the first target access network includes only the first access network, the first device sends the positioning signal by directly using the first access network; when the first target access network includes only the second access network, the first device sends the positioning signal by directly using the second access network; and when the first target access network includes two access networks, that is, the first access network and the second access network, the first device sends the positioning signal to the second device by using the two access networks, that is, the first access network and the second access network. The first device can specifically divide the positioning signal into two parts, which are respectively a first positioning signal and a second positioning signal; then send the first positioning signal to the second device through the first access network; and send the second positioning signal to the second device through the second access network. How the first device divides the positioning signal into two parts, that is, the first positioning signal and the second positioning signal is not limited in this embodiment of this application. For example, in an example, the first device may send the positioning signal in the first 5 milliseconds to the second device through the first access network, and send the positioning signal in the last 5 milliseconds to the second device through the second access network, so that the positioning signal in the first 5 milliseconds may be referred to as the first positioning signal, and the positioning signal in the last 5 milliseconds may be referred to as the second positioning signal.

In an example of this application, the positioning signal may specifically include two types, which are respectively a signal used for positioning measurement and information used for positioning. The signal used for positioning measurement, for example, may specifically be a positioning reference signal (Positioning Reference Signal, PRS) and an uplink sounding reference signal (Sounding reference signal, SRS signal). The PRS is mainly used in a process of downlink positioning measurement. How to implement downlink positioning measurement is described in detail in the following of this embodiment of this application. The SRS is mainly used in a process of uplink positioning measurement. Likewise, how to implement uplink positioning measurement is described in detail in the following of this embodiment of this application. The signaling used for positioning may specifically be positioning auxiliary information, positioning configuration information, and the like in downlink; and may specifically be a positioning request, a positioning report, and the like in uplink.

In this embodiment of this application, for ease of description, a signal used for positioning measurement may specifically be referred to as the positioning reference signal. Periods and bandwidths in which the first device sends positioning reference signals in the first access network may be the same and may be different. In an example, the period in which the positioning reference signal is sent in the first access network may be referred to as a first period, and a bandwidth for sending the positioning reference signal may be referred to as a first bandwidth, and a period in which the positioning reference signal is sent in the second access network may be referred to as a second period, and a bandwidth for sending the positioning reference signal may be referred to as a second bandwidth.

Therefore, when the first target access network determined by the first device includes only the first access network, the first device may send the positioning reference signal to the second device by using first duration as a period and by using the first access network, and the bandwidth for sending the positioning reference signal is the first bandwidth.

When the first target access network determined by the first device includes only the second access network, the first device may send the positioning reference signal to the second device by using second duration as a period and by using the second access network, and the bandwidth for sending the positioning reference signal is the second bandwidth.

When the first target access network determined by the first device includes two access networks, that is, the first access network and the second access network, correspondingly, as described, the positioning reference signal may specifically be divided into a first positioning reference signal and a second positioning reference signal, so that the first device can send the first positioning reference signal to the second device by using the first duration as a period and by using the first access network, and the bandwidth for sending the first positioning reference signal is the first bandwidth; moreover, the first device can send the second positioning reference signal to the second device by using the second duration as a period and by using the second access network, and the bandwidth for sending the second positioning reference signal is the second bandwidth. The division of the first positioning reference signal and the second positioning reference signal is not limited in this embodiment of this application.

Step S23. The first device performs corresponding processing on the positioning signal.

In this embodiment of this application, when the positioning signal is specifically the positioning reference signal for positioning measurement, and when the first device sends the positioning reference signal through the first access network the second device may directly receive the positioning reference signal through the first access network and process the received positioning reference signal to obtain a positioning measurement result. How the second device processes the positioning measurement result is described below in detail. Likewise, when the first device sends the positioning reference signal through the second access network, the second device may directly receive the positioning reference signal through the second access network and process the received positioning reference signal to obtain a positioning measurement result.

In this embodiment of this application, when the first device sends the positioning reference signal through two networks, that is, the first access network and the second access network, the second device may select (which may also be referred to as determine) an access network from the first access network and the second access network to receive the positioning reference signal. For ease of description, the access network selected by the second device may be referred to as a second target access network. Similar to the first target access network, the second target access network may be the first access network or may be the second access network, or may include both the first access network and the second access network.

In this embodiment of this application, the process in which the second device selects (which may also be referred to as determines) the second target access network may be based on the following criterion, for example, an indication of a positioning server or an indication of a base station; or a pre-specified protocol principle, or load condition, channel quality, a throughput, and positioning accuracy of an access network (for example, the second network device can select an access network with small load, good channel quality, a large throughput, and high positioning accuracy as the second target access network). In an example of this application, the criterion based on which the second device selects the second target access network may be the same as the criterion based on which the first device selects the first target access network, for example, the first condition being satisfied and preconfiguration. Details are not described herein again.

In this embodiment of this application, the second device may receive the positioning reference signal through the second target access network and obtain the positioning measurement result based on the received positioning reference signal. For example, the second device selects the first access network (correspondingly, the first access network may be referred to as the second target access network), the second device may receive the positioning reference signal through the first access network and obtain the positioning measurement result based on the received positioning reference signal. Likewise, if the second device selects the second access network (correspondingly, the second access network may be referred to as the second target access network), the second device may receive the positioning reference signal through the second access network and obtain the positioning measurement result based on the received positioning reference signal. When the second device selects both the first access network and the second access network (correspondingly, the first access network and the second access network may both be referred to as the second target access network). For ease of description, the positioning reference signal sent by the first device through the first access network may be referred to as the first positioning reference signal, and the positioning reference signal sent by the second access network through the first device may be referred to as the second positioning reference signal. Therefore, in this embodiment of this application, after the second device receives the first positioning reference signal through the first access network and receives the second positioning reference signal through the second access network, the second device can determine whether the first positioning reference signal and the second positioning reference signal satisfy the second condition. If the first positioning reference signal and the second positioning reference signal satisfy the second condition, the second device performs joint detection on the first positioning reference signal and the second positioning reference signal. If the first positioning reference signal and the second positioning reference signal do not satisfy the second condition, the second device respectively detects the first positioning reference signal and the second positioning reference signal. In an example, the second condition may specifically be whether phase of the first positioning reference signal and phase of the second positioning reference signal are continuous and whether the first positioning reference signal and the second positioning reference signal are synchronous.

In this embodiment of this application, if the first device respectively detects the first positioning reference signal and the second positioning reference signal, the positioning measurement result can be obtained in the following manners. A first manner: The first device may obtain the first positioning measurement result based on the first positioning reference signal; obtain the second positioning measurement result based on the second positioning reference signal; and finally report the first positioning measurement result and the second positioning measurement result to another network element (for example, a base station or a positioning server). The another network element processes the first positioning measurement result and the second positioning measurement result, for example, uniformly averages the first positioning measurement result and the second positioning measurement result to obtain a final positioning measurement result. A second manner: The first device may obtain the first positioning measurement result based on the first positioning reference signal; obtain the second positioning measurement result based on the second positioning reference signal; and then the first device processes the first positioning measurement result and the second positioning measurement result (for example, uniformly averages), to obtain a final measurement result. Finally, the first device reports the final positioning measurement result to another network element (for example, a base station or a positioning server).

In this embodiment of this application, if the first device performs joint detection on the first positioning reference signal and the second positioning reference signal, the first device may combine the first positioning reference signal and the second positioning reference signal into an integrity to obtain a combined positioning reference signal, and obtain the positioning measurement result based on the combined positioning reference signal. The positioning measurement result may specifically be power, phase, and time of arrival of the reference signal. In an example, the process may specifically be: The first device generates a total local positioning reference signal that mixes the first positioning reference signal and the second positioning reference signal, then performs related operations on the total local positioning reference signal and the combined positioning reference signal, to obtain the positioning measurement result, and reports the final positioning measurement result to another network element.

Figure 3:
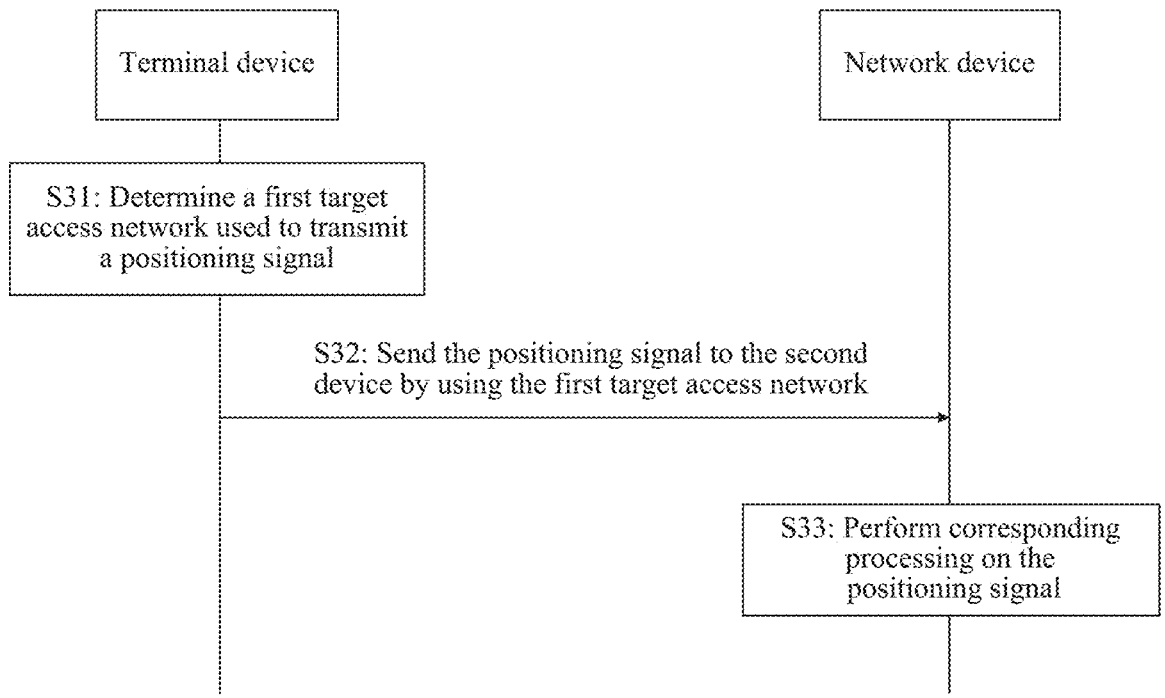

FIG. 3 shows a procedure of sending a positioning signal according to an embodiment of this application. A network device in the procedure may correspond to the base station shown in FIG. 1A or FIG. 1B (for example, the NR base station 10 or the LTE base station 20 in FIG. 1A or FIG. 1B) and the first device shown in FIG. 2. A terminal device may correspond to the UE 30 shown in FIG. 1A or FIG. 1B and the second device shown in FIG. 2. As shown in FIG. 3, the procedure specifically includes:

Step S31. The terminal device determines a first target access network used to transmit a positioning signal, where the first target access network includes at least one of a first access network and a second access network.

Step S32. The terminal device sends the positioning signal to the network device through the first target access network.

In this embodiment of this application, the terminal device maintains a connected state with the first access network and the second access network.

Step S33. The network device performs corresponding processing on the positioning signal.

It should be noted that the procedure shown in FIG. 3 may be specifically applied to a scenario in which an uplink positioning signal is sent. For the process in which the terminal device selects the first target access network and sends the positioning signal and the process in which the network device processes the positioning signal, refer to specific descriptions in FIG. 2.

Figure 4:
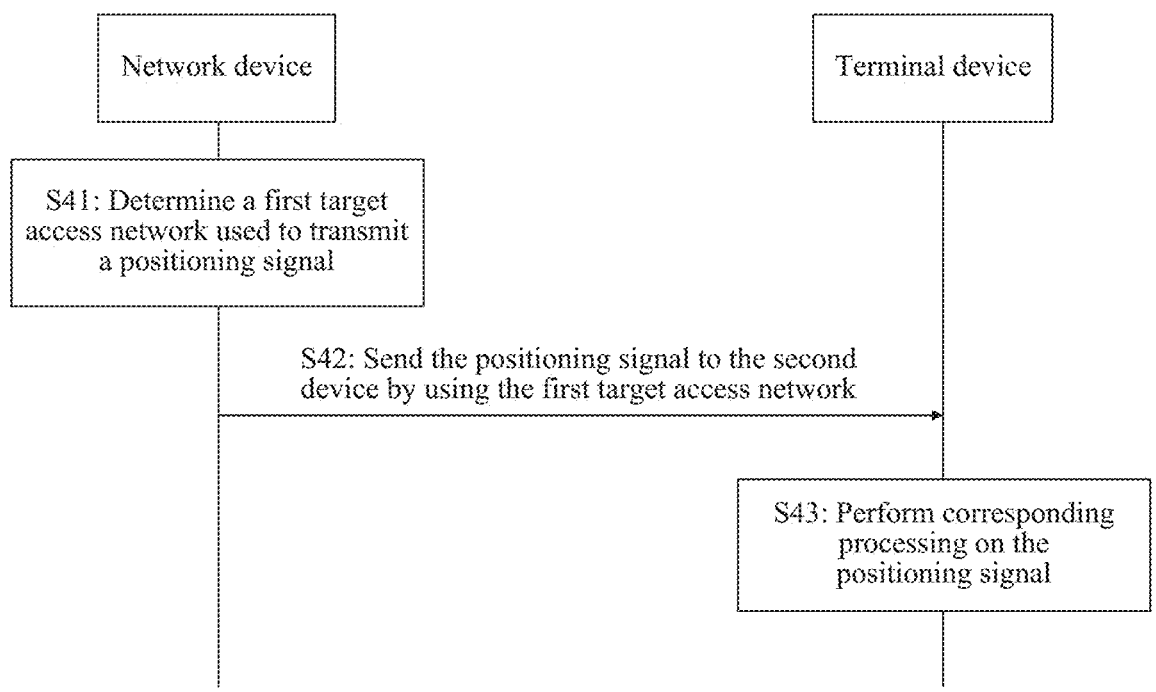

FIG. 4 shows a procedure of sending a positioning signal according to an embodiment of this application. A network device in the procedure may correspond to the base station shown in FIG. 1A or FIG. 1B (for example, the NR base station 10 or the LTE base station 20 in FIG. 1A or FIG. 1B) and the second device shown in FIG. 2. A terminal device may correspond to the UE 30 shown in FIG. 1A or FIG. 1B and the first device shown in FIG. 2. As shown in FIG. 4, the procedure specifically includes:

Step S41. The network device determines a first target access network used to transmit a positioning signal, where the first target access network includes at least one of a first access network and a second access network.

Step S42. The network device sends the positioning signal to the terminal device by using the first target access network.

In this embodiment of this application, the terminal device maintains a connected state with the first access network and the second access network.

Step S43. The terminal device performs corresponding processing on the positioning signal.

It should be noted that the procedure shown in FIG. 4 may be specifically applied to a scenario in which a downlink positioning signal is sent. For the specific process in which the network device selects the first target access network and sends the positioning signal and the process in which the terminal device processes the positioning signal, refer to specific descriptions in FIG. 2.

Figure 5:
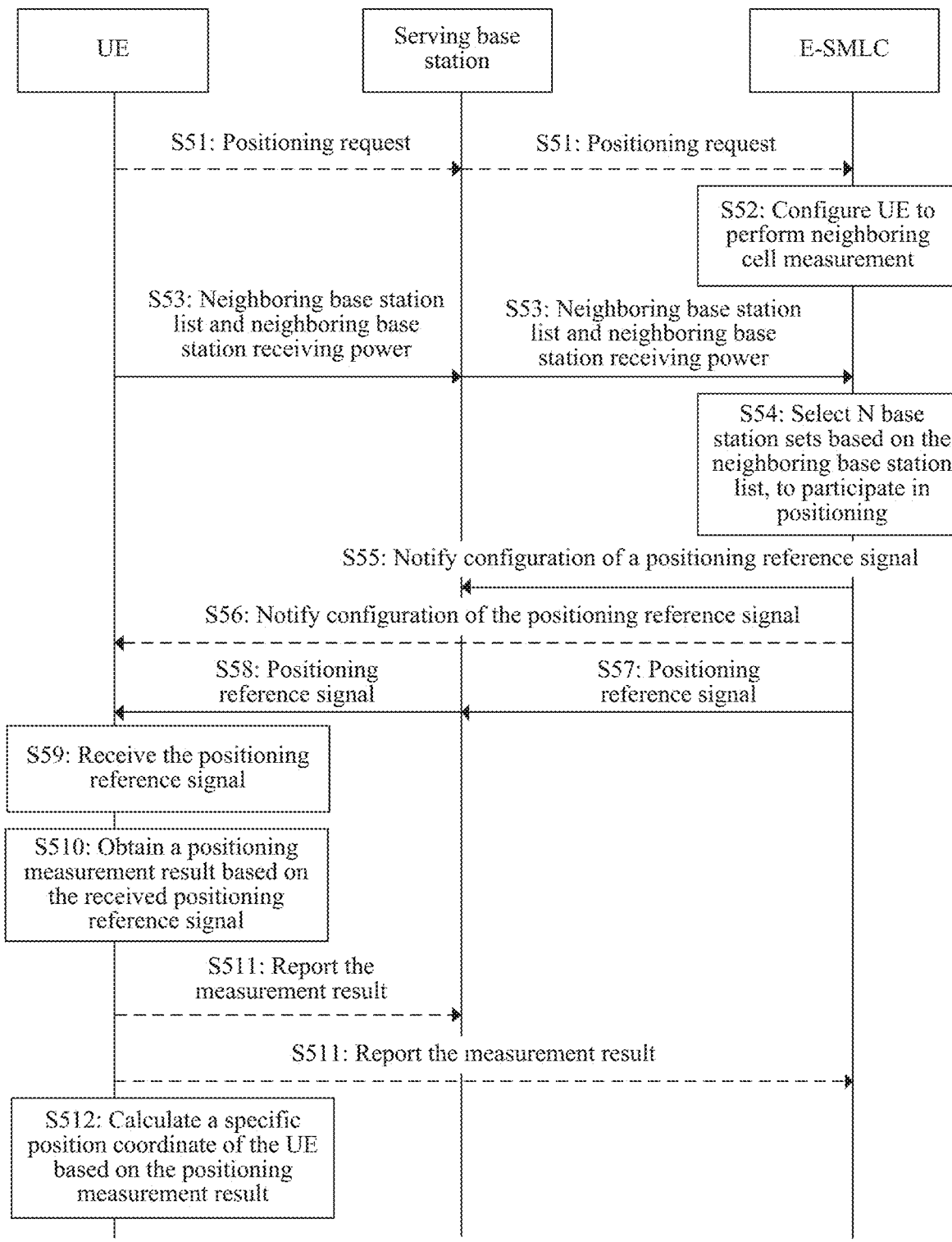

The method for sending a positioning signal that is provided in the embodiments of this application is described in detail in combination with a scenario in which a DTDOA-based algorithm is used to perform positioning measurement on UE. As shown in FIG. 5, an embodiment of this application provides a procedure of sending a positioning signal. UE in the procedure may correspond to the UE 30 in FIG. 1A or FIG. 1B, correspond to the first device or the second device in FIG. 2, and correspond the terminal device in FIG. 3 and FIG. 4. An LTE base station in the procedure may correspond to the LTE base station 10 in FIG. 1A or FIG. 1B, the NR base station may correspond to the NR base station 20 in FIG. 1A or FIG. 1B, and the LTE base station and the NR base station may correspond to the second device or the first device in FIG. 2, and correspond to the network device in FIG. 3 and FIG. 4. A positioning server (Evolved SMLC, E-SMLC) may correspond to the positioning server 40 in FIG. 1A, and correspond to the NR positioning server 41 or the LTE positioning server 42 in FIG. 1B. A positioning request, a neighboring cell list, a positioning reference signal, and the like may correspond to the positioning signal in FIG. 2 to FIG. 4. As shown in FIG. 5, the procedure may specifically include:

First, it should be noted that in this embodiment of this application, the UE is in a dual connectivity state, and maintains a connected state with an LTE access network and an NR access network. When the UE is in a dual connectivity state, and maintains a connected state with the LTE access network and the NR access network, the UE may send the positioning signal to the LTE base station through the LTE access network in uplink. Then the LTE base station may forward the positioning signal to the positioning server. Alternatively, the UE may send the positioning signal to the NR base station through the NR access network. Then the NR base station may forward the positioning signal to the positioning server. Alternatively, the UE may send a first positioning signal to the NR base station through the NR access network, then the NR base station may send the first positioning signal to the positioning server: and the UE may send a second positioning signal to the LTE base station through the LTE access network, and the LTE base station may send the second positioning signal to the positioning server. In this embodiment of this application, both the first positioning signal and the second positioning signal may be referred to as the positioning signal.

Step S51. The UE sends a positioning request to an E-SMLC.

In this embodiment of this application, the UE may specifically send the positioning request to the E-SMLC through the LTE access network, or send the positioning request to the E-SMLC through the NR access network, or send the positioning request to the E-SMLC through the LTE access network and the NR access network.

In this embodiment of this application, which one of the LTE access network, the NR access network, or the LTE access network and the NR access network that the UE specifically uses may be based on the following criteria:

(1) Configuration of a base station. For example, the base station preconfigures that the UE reports the positioning request by using the LTE access network, so that in step S51, the LTE access network is used to report the positioning request. In this application, when configuring, for the UE, the access network for sending the positioning request, the base station can determine based on load, channel quality, a throughput, and the like of the access network.

(2) Measurement of the UE. In this embodiment of this application, the UE may determine based on channel quality, a throughput, and the like of the access network that measured by the UE. For example, when channel quality of the LTE access network is greater than channel quality of the NR access network, the LTE access network is the access network for sending the positioning request.

(3) A pre-agreed protocol. For example, the protocol can stipulate to use only the LTE access network, or use only the NR access network, or preferentially use the LTE access network, or preferentially use the NR access network, or use both the LTE access network and the NR access network.

Specifically, in this embodiments of this application, the UE may send the positioning request to a serving base station through the access network, and the serving base station forwards the positioning request to the E-SMLC.

It should be noted that, in this embodiment of this application, the positioning request may be initiated by the UE, or may be initiated by a network end, for example, directly initiated by the E-SMLC. When the positioning request is initiated by the network end, step S51 is optional.

Step S52. After the E-SMLC receives the positioning request, the E-SMLC configures the UE to perform neighboring cell measurement.

In this embodiment of this application, the E-SMLC may configure serving base stations of one or more different access networks of the UE to report a neighboring cell list, where the neighboring cell list may include the LTE base station and the NR base station. (the step is optional)

Step S53. The UE reports a measured neighboring base station list and neighboring base station receiving power to the E-SMLC.

In this embodiment of this application, the UE may report the neighboring base station list and the neighboring base station receiving power by using the NR access network, or the UE may report the neighboring base station list and the neighboring base station receiving power by using the LTE access network, or the UE may report the neighboring base station list and the neighboring base station receiving power by using the LTE access network and the NR access network simultaneously.

In an example of this embodiment of this application, a criterion that the UE uses to select the access network to report the neighboring base station list and the neighboring base station receiving power may be the same as the criterion of determining the access network for reporting the positioning request. Details are not described herein again.

Step S54. The E-SMLC selects, based on the neighboring base station list. N base station sets to participate in positioning, where N is an integer greater than or equal to 3.

In an example of this application, the E-SMLC may select the first N base stations with highest UE receiving powers, or select, from the NR access network and the LTE access network, N base stations with different distances from the UE and the like.

Step S55. The E-SMLC notifies the serving base station of configuration of the positioning reference signal.

In this embodiments of this application, the serving base station may specifically be N base stations with highest UE accessing power that are selected by the E-SMLC. The N base stations will participate in positioning measurement of the UE. The N base stations are mainly configured to send a measuring reference signal, and the UE may obtain position information of the UE based on a time difference of arrival of downlink measuring reference signals sent by different base stations.

In this embodiment of this application, optionally, after step S55, the procedure may further include: step S56: The E-SMLC notifies the UE of configuration of the positioning reference signal.

An application scenario of this embodiment of this application is mainly a DTDOA, and a main principle is: The serving base station sends the positioning reference signal, and the UE obtains the position information of the UE by calculating a time difference of arrival of positioning reference signals sent by different base stations. In an actual application, a main usage of step S56 is to notify the UE of configuration of the positioning reference signal, which is convenient for the UE to receive the positioning reference signal sent by the serving base station. In this embodiment of this application, if step S56 is not performed, the UE also receives the positioning reference signal through blind detection.

In an example of this embodiment of this application, configuration of the positioning reference signal may include a period and a bandwidth in which the base station sends the positioning reference signal. In this embodiment of this application, configuration of the positioning reference signal may be determined based on a series of indicators such as a positioning accuracy requirement, advice of the UE, advice of the base station, advice of the E-SMLC or the like. In this embodiment of this application, periods and bandwidths in which he serving base station sends the positioning reference signal through different access networks may be the same or may be different. In an example, specifically, a period in which the serving base station sends the positioning reference signal through the LTE access network may be a first period, and a bandwidth for sending the positioning reference signal is a first bandwidth; and a period in which the serving base station sends the positioning reference signal through the NR access network may be a second period, and a bandwidth for sending the positioning reference signal is a second bandwidth. The first period is different from the second period, and the first bandwidth is different from the second bandwidth.

Step S57. The E-SMLC sends the positioning reference signal to the serving base station.

In this embodiment of this application, the serving base stations may specifically be greater than or equal to three. The serving base stations may specifically be LTE base stations, NR base stations, or the LTE base stations and the NR base stations. In this embodiment of this application, the positioning reference signals of different serving base stations may be the same or may be different. The positioning reference signal may also be referred to as PRS (positioning reference signal).

Step S58. The serving base station sends the positioning reference signal to the UE.

In this embodiment of this application, the serving base station may specifically send the positioning reference signal through the LTE access network, or may specifically send the positioning reference signal through the NR access network, or may send the positioning reference signal through the NR access network and the LTE access network. A determining criterion of a specifically used access network may be the same as the determining criterion of an access network for sending an access request. Details are not described herein again.

Step S59. The UE receives the positioning reference signal.

In this embodiment of this application, when the serving base station sends the positioning reference signal by using the LTE access network, the UE may receive the positioning reference signal through the LTE access network. When the serving base station sends the positioning reference signal by using the NR access network, the UE may receive the positioning reference signal through the NR access network. When the serving base station sends the positioning reference signal by using the LTE access network and the NR access network, the UE may select which access network is specifically used to receive the positioning reference signal. A criterion of selecting the access network through which the positioning reference signal is received may specifically be the same as the principle of selecting the access network through which the access request is sent. Details are not described herein again.

Step S510. The UE obtains a positioning measurement result based on the received positioning reference signal.

In this embodiment of this application, a positioning reference signal received by the UE through the LTE access network is set to an LTE positioning reference signal, and a positioning reference signal received by the UE through the NR access network is set to an NR positioning reference signal.

In an example of this embodiment of this application, the UE is set to receive the LTE positioning reference signal only through the LTE access network, so that the process in which the UE calculates the positioning measurement result based on the LTE positioning reference signal may be as follows:

(1) The UE generates a local positioning reference signal sequence.

In an example of this application, the serving base station may send timing information of the positioning reference signal to the UE when sending the positioning reference signal to the UE. The UE may generate the local positioning reference sequence based on the timing information of the positioning reference signal.

(2) The UE performs related comparison on a sequence corresponding to the received LTE positioning reference signal (for ease of description, it can be referred to as the LTE positioning reference signal sequence) and the local positioning reference signal sequence (for example, compares a phase difference of the two), to obtain a TOA between each serving base station and the UE. Two different TOAs are subtracted to obtain a reference signal time difference (reference signal time difference, RSTD).

(3) Distances between the UE and different serving base stations may be calculated by using the RSTD. Coordinates of at least three base stations and three distance differences are listed in three hyperbolic equations to obtain a position estimation of the UE.

In an example of this application, the UE is set to receive the NR positioning reference signal only through the NR access network, so that the UE calculates the positioning measurement result based on the NR positioning reference signal, which is similar to the process of calculating the positioning measurement result based on the LTE positioning reference signal. Details are not described herein again.

In an example of this application, the UE is set to receive the LTE positioning reference signal through the LTE access network, and receive the NR positioning reference signal through the NR access network, so that the process in which the UE calculates the positioning measurement result based on the LTE positioning reference signal and the NR positioning reference signal may be as follows:

The UE determines whether jointly detection can be performed on the LTE positioning reference signal and the NR positioning reference signal. An indicator of whether jointly detection can be performed on the two may be: whether phase of the LTE positioning reference signal and phase of the NR positioning reference signal are continuous, whether the LTE positioning reference signal and the NR positioning reference signal are synchronous, and the like. When determining that jointly detection can be performed on the LTE positioning reference signal and the NR positioning reference signal, the UE performs jointly detection on the LTE positioning reference signal and the NR positioning reference signal: otherwise, the UE respectively detects the LTE positioning reference signal and the NR positioning reference signal.

In an example of this embodiment of this application, if jointly detection is performed on the LTE positioning reference signal and the NR positioning reference signal, the LTE positioning reference signal and the NR positioning reference signal may be combined to obtain an integral positioning reference signal. Moreover, the first device can also generate a total local positioning reference signal that mixes the NR positioning reference signal and the LTE positioning reference signal, and may obtain a total positioning measurement result based on the total local positioning reference signal and the combined integral positioning reference signal. The process about how to obtain the total positioning measurement result based on the total local positioning reference signal and the combined integral positioning reference signal is similar to the process of obtaining the positioning measurement result based on the LTE positioning reference signal and the local positioning reference signal. Details are not described herein again.

Optionally, after step S510, the procedure may further include step S511: reporting the positioning measurement result to another network element, where the another network element may specifically be the serving base station or a positioning server. Correspondingly, a specific position coordinate of the UE may be calculated by the another network element based on the positioning measurement result.

In this embodiment of this application, the UE may select the LTE access network, the NR access network, and the LTE access network and the NR access network to report the positioning measurement result. The specific process of selecting the positioning measurement result is similar to the process in which the UE determines the reporting request. Details are not described herein again.

Optionally, after step S510 or step S511, the process may include: S512: The UE calculates a specific position coordinate of the UE based on the positioning measurement result.

Optionally, after completing positioning measurement, a receiver reports the positioning measurement result to another network element (the UE, the base station, the positioning server, and the like) to calculate the specific position coordinate of the UE.

The receiver may select which access network or combination of access networks used to transfer the positioning measurement result. The selecting basis may be: an indication from the base station, the positioning server, and the UE, a preset convention, and determining by the receiver. The determining basis may be: load statuses, channel quality, throughputs, and positioning accuracy of different access networks.

Step S512. The UE calculates a specific position coordinate of the UE based on the positioning measurement result.

Figure 7:
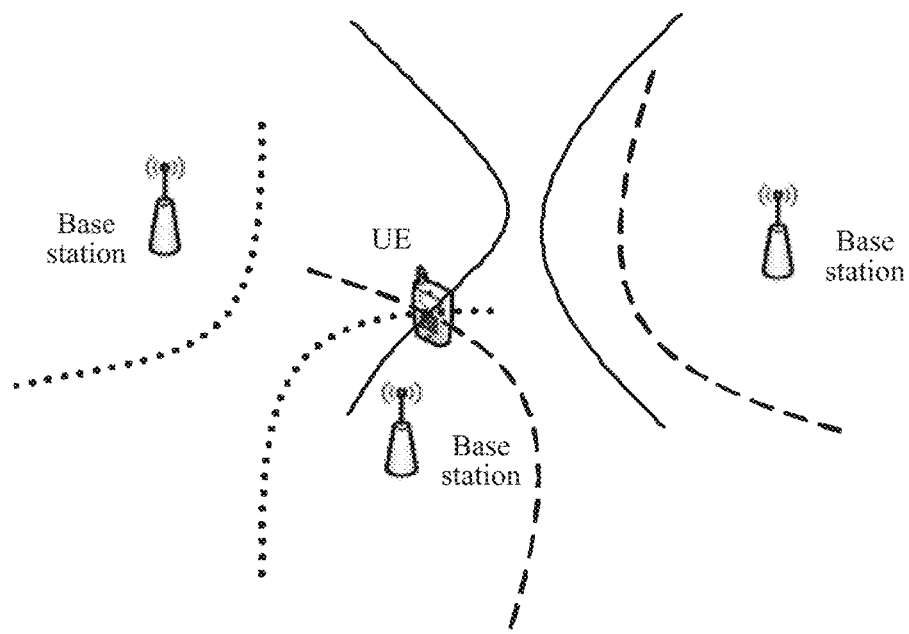
FIG. 7 is a schematic diagram of a triangle positioning method according to an embodiment of this application.

In this embodiment of this application, the positioning measurement result may specifically be receiving power of the reference signal power, a time difference of arrival of different reference signals or a phase difference of arrival of different reference signals. In this embodiment of this application, the positioning measurement result may be converted into the position of the UE to the base station, and then the position coordinate of the UE is calculated based on positions of the different base stations to the UE. For example, as shown in FIG. 7, when the measurement result is greater than is equal to 3, the position coordinate of the UE may be obtained by using a triangular positioning method.

By using the method provided in this embodiment of this application, a plurality of access networks can be properly used for positioning. Through joint detection of a plurality of access networks, the latter properly selects an access network, thereby improving positioning accuracy, reducing impact of positioning on data traffic, reducing UE power consumption (reducing positioning duration), reducing spectrum occupation of the positioning reference signal, and the like.

Figure 6:
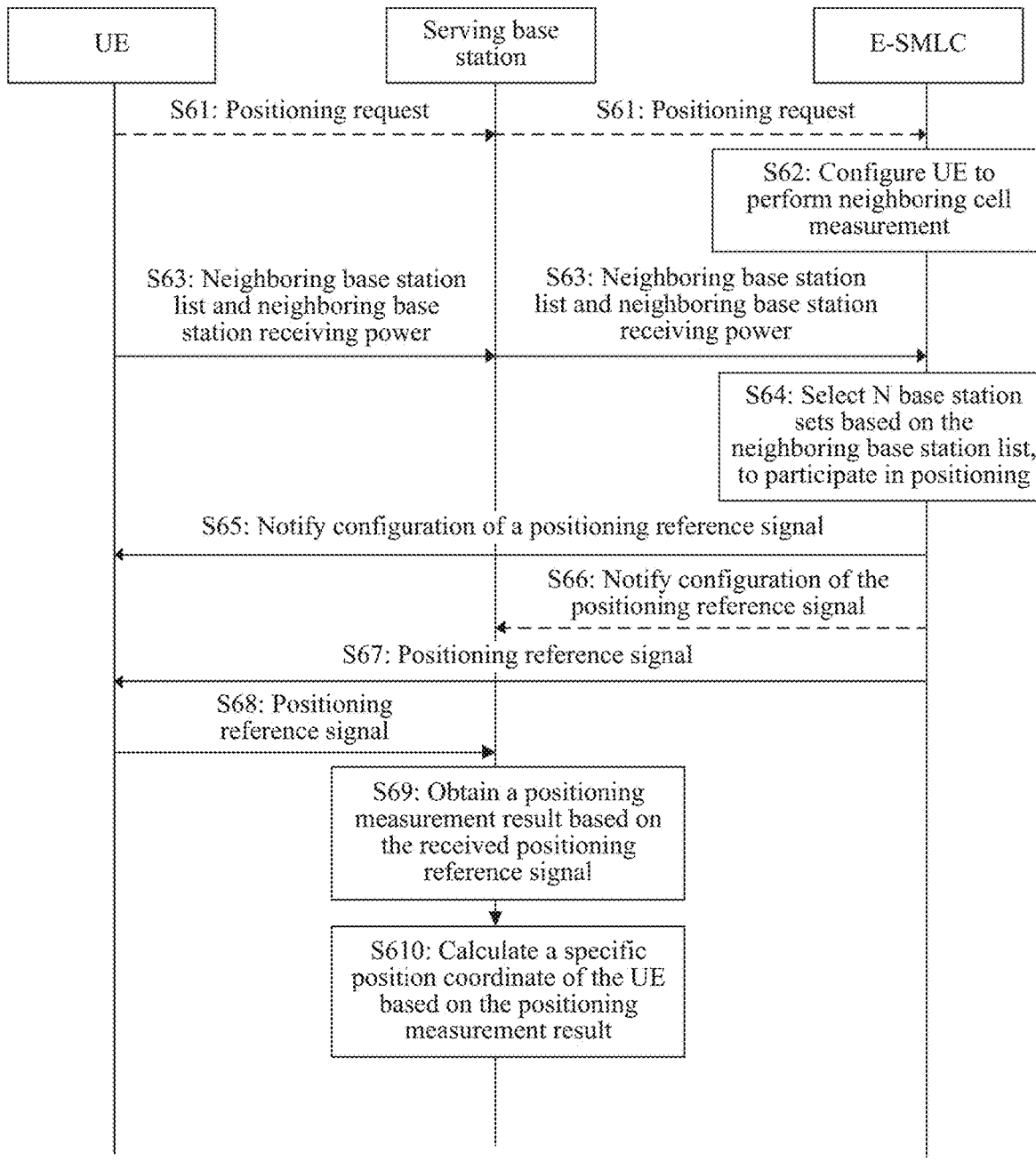

The method for sending a positioning signal that is provided in the embodiment of this application is described in detail in combination with a scenario in which a UTDOA-based algorithm is used to perform positioning measurement on UE. As shown in FIG. 6, a procedure of sending a positioning signal is provided in an embodiment of this application. UE in the procedure may correspond to the UE 30 in FIG. 1A or FIG. 1B, correspond to the first device or the second device in FIG. 2, and correspond the terminal device in FIG. 3 and FIG. 4. An LTE base station in the procedure may correspond to the LTE base station 10 in FIG. 1A or FIG. 1B, an NR base station may correspond to the NR base station 20 in FIG. 1A or FIG. 1B, and the LTE base station and the NR base station may correspond to the second device or the first device in FIG. 2, and correspond to the network device in FIG. 3 and FIG. 4. A positioning server (Evolved SMLC, E-SMLC) may correspond to the positioning server 40 in FIG. 1A, and correspond to the NR positioning server 41 or the LTE positioning server 42 in FIG. 1B. A positioning request, a neighboring cell list, a positioning reference signal, and the like may correspond to the positioning signal in FIG. 2 to FIG. 4. As shown in FIG. 6, the procedure may specifically include:

Step S61. The UE sends a positioning request to the E-SMLC.

It should be noted that, in this embodiment of this application, the positioning request may be initiated by the UE, or may be initiated by a network end, for example, directly initiated by the E-SMLC. When the positioning request is initiated by the network end, step S51 is optional.

Step S62. After the E-SMLC receives the positioning request, the E-SMLC configures the UE to perform neighboring cell measurement.

Step S63. The UE reports a measured neighboring base station list and neighboring base station receiving power to the E-SMLC.

Step S64. The E-SMLC selects, based on the neighboring base station list, N base station sets to participate in positioning, where N is an integer greater than or equal to 3.

Step S65. The E-SMLC notifies serving UE of configuration of a positioning reference signal.

In this embodiment of this application, optionally, after step S65, the procedure may further include: step S66: The E-SMLC notifies a serving station of configuration of the positioning reference signal.

An application scenario of this embodiment of this application is mainly a DTDOA, and a main principle is: The UE sends the positioning reference signal, and the serving base station obtains position information of the UE by calculating a time difference of arrival of different positioning reference signals sent by the UE. In an actual application, a main function of step S66 is to notify the serving base station of configuration of the positioning reference signal, which is convenient for the serving base station to receive the positioning reference signal sent by the UE. In this embodiment of this application, if step S66 is not performed, the serving base station also receives the positioning reference signal through blind detection. In an example of this application, the positioning reference signal may be an uplink sounding reference signal (sounding reference signal, SRS).

Step S67. The E-SMLC sends the positioning reference signal to the UE through the serving base station.

Step S68. The UE sends the positioning reference signal to the serving base station.

Step S69. The serving base station obtains a positioning measurement result based on the received positioning reference signal.

Step S610. The serving base station calculates a specific position coordinate of the UE based on the positioning measurement result.

It should be noted that, for specific descriptions of step S61 to step S610, reference may also be made to descriptions in FIG. 5. Details are not described herein again.

With reference to the communications system 100 provided in FIG. 1B in the embodiments of this application, this application provides the following application scenario, which is specifically as follows:

An example of the application scenario:

(1) UE sends a positioning request to the NR positioning server 42.

(2) When receiving the positioning request, the NR positioning server 42 sends the positioning request to the LTE positioning server 41.

In the embodiments of this application, the NR positioning server 42 can interact with the LTE positioning server 41, and configure and obtain configuration of a reference signal of an LTE access network. Configuration of the positioning reference signal may include a bandwidth, a sequence, an antenna port, and the like of the positioning reference signal. Alternatively, the NR positioning server 42 can interact with the LTE positioning server 41, and configures a positioning measurement task of the LTE base station 10.

(3) The LTE positioning server 41 performs position measurement of the UE. The method that the LTE positioning server 41 uses to perform position measurement may be the method provided in FIG. 5 or FIG. 6. When the LTE positioning server performs information exchange with the UE, the method for sending a reference signal provided in FIG. 2 to FIG. 4 may be specifically used.

(4) The LTE positioning server 41 notifies the NR positioning server 42 of the positioning measurement result.

(5) The NR positioning server 42 notifies the UE of the positioning measurement result.

An example of the application scenario:

(1) The LTE positioning server 41 receives a UE positioning request.

(2) The LTE positioning server 41 sends the positioning request to the NR positioning server 42.

In the embodiments of this application, the LTE positioning server 41 can interact with the NR positioning server 42, and configure and obtain configuration of the positioning reference signal of an NR access network. Configuration of the positioning reference signal may include a bandwidth, a signal sequence, an antenna port, and the like of the positioning reference signal.

(3) The NR positioning server 42 performs positioning measurement on the UE.

(4) The NR positioning server 42 notifies the LTE positioning server 41 of a positioning measurement result.

(5) The LTE positioning server 41 notifies the UE of the positioning measurement result.

By using the method provided in the embodiments of this application, a plurality of access networks can be properly used to locate the UE. When some access networks do not support positioning, other access networks can be used to implement the positioning function of the UE.

In the foregoing embodiments provided this application, various solutions such as the resource configuration method, the resource notification method, the interference detection method and the communications link concurrency resource multiplexing method provided in the embodiments of this application are described separately from the perspectives of network elements and interaction between the network elements. It may be understood that, to implement the foregoing functions, each network element such as UE, a base station, and a control node, includes a corresponding hardware structure and/or software module for performing each function. A person skilled in the art should easily be aware that, in combination with the examples of units and algorithm steps described in the embodiments disclosed in this specification, this application can be implemented by hardware or a combination of hardware and computer software. Whether a function is performed by hardware or computer software driving hardware depends on particular applications and design constraints of the technical solutions. A person skilled in the art may use different methods to implement the described functions for the particular applications, but it should not be considered that the implementation goes beyond the scope of this application.

Figure 8:
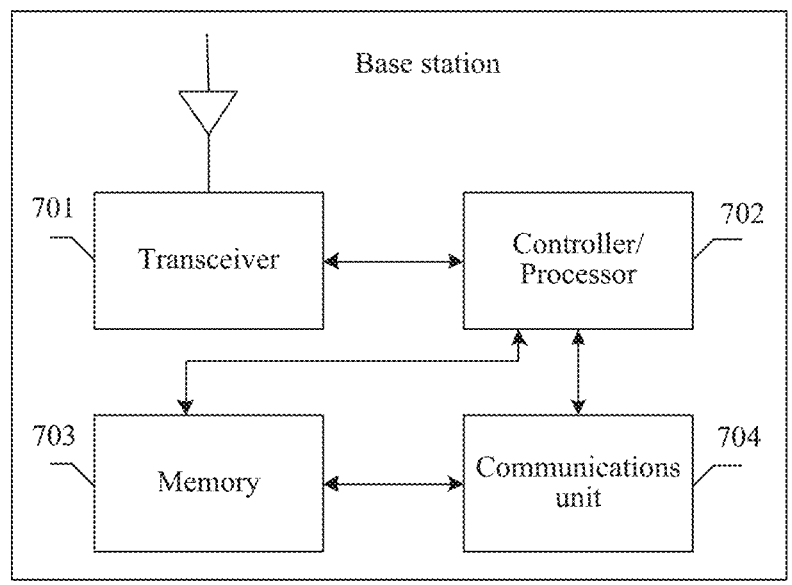
FIG. 8 is a schematic diagram of a base station according to an embodiment of this application.

FIG. 8 is a possible schematic structural diagram of the base station in the foregoing embodiments. The base station may be the LTE base station 10 or the NR base station 20 shown in FIG. 1A or FIG. 1B, or the base station may be the first device or the second device in FIG. 2, the network device in FIG. 3 and FIG. 4, and the LTE base station or the NR base station in FIG. 5 or FIG. 6.

The base station includes a transceiver 701, and a controller/processor 702. The transceiver 701 can be configured to support information sending and receiving between the base station and the UE in the foregoing embodiments, and support radio communication between the UE and another UE. The controller/processor 702 can be configured to perform various functions used for communication with the UE and another network device. On uplink, an uplink signal from the UE is received by using an antenna, demodulated by the transceiver 701, and is further processed by the controller/processor 702 to restore service data and signaling information that are sent by the UE. On downlink, the service data and the signaling message are processed by the controller/processor 702 and are demodulated by the transceiver 701 to generate a downlink signal, and the downlink signal is transmitted to the UE by using the antenna. The controller/processor 702 is further configured to perform the step of determining a first target access network, and sending the positioning signal to a second device through the first target access network. The controller/processor 702 can further be configured to perform a processing process of the base station in FIG. 5 or FIG. 6 and/or another process used for the technology described in this application, for example, a process of determining a second target access network and generating a positioning measurement result based on a measuring reference signal. The base station may further include a memory 703, configured to store program code and data of the base station. The base station may further include a communications unit 704, configured to support the base station to communicate with another network entity. For example, the communications unit 704 is configured to support the base station to communicate with another communications network entity shown in FIG. 1A or FIG. 1B, such as a positioning server.

It may be understood that FIG. 8 only shows a simplified design of the base station. In an actual application, the base station may include any quantity of transmitters, receivers, processors, controllers, memories, communications units, and the like, and all base stations that can implement the present invention shall fall within the protection scope of the present invention.

Figure 9:
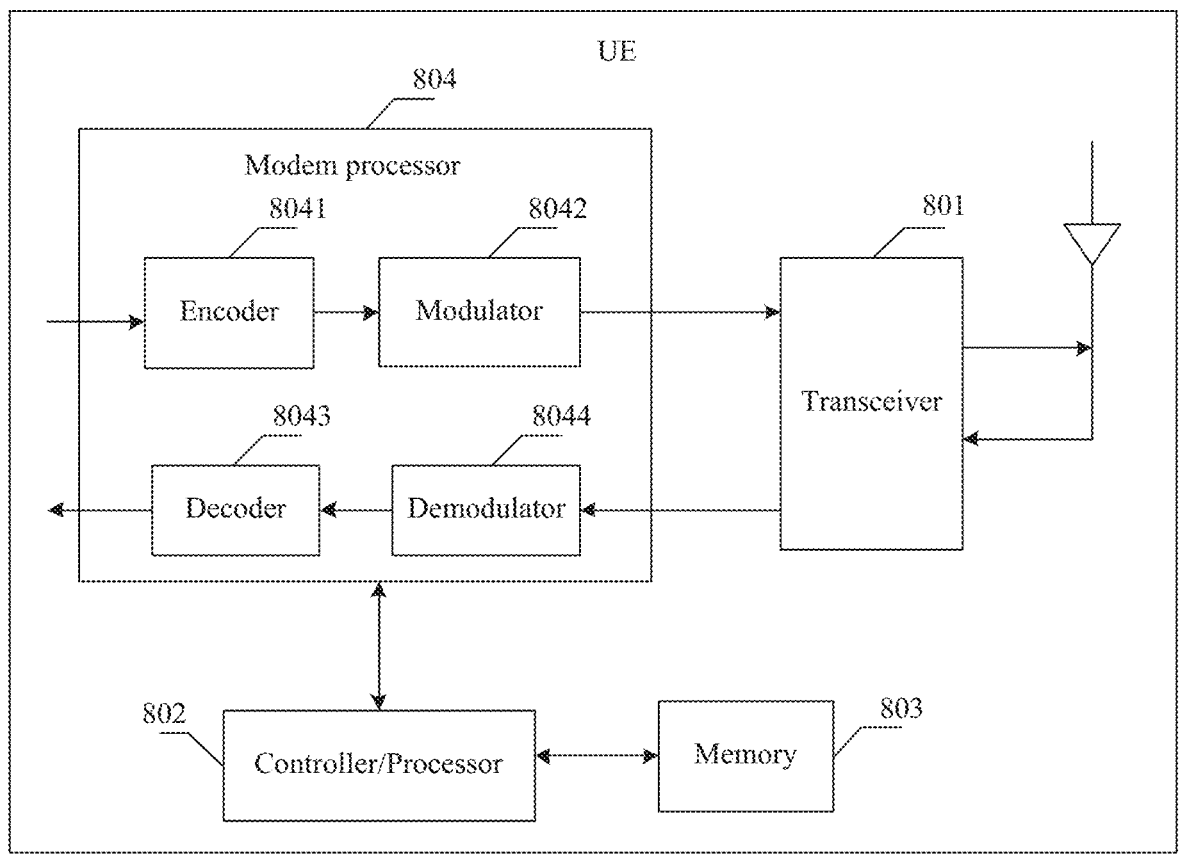
FIG. 9 is a schematic diagram of UE according to an embodiment of this application.

FIG. 9 is a simplified schematic diagram of a possible design structure of the UE in the foregoing embodiments. The UE may be the UE 30 shown in FIG. 1A or FIG. 1B, may be the first device or the second device in FIG. 2, the terminal device in FIG. 3 to FIG. 4, and may also be the UE in FIG. 5 and FIG. 6. The UE includes a transceiver 801, a controller/processor 802, and may also include a memory 803 and a modem processor 804.

The transceiver 801 adjusts (for example, analog converts, filters, amplifies, and up-converts) the output sampling and generates an uplink signal. The uplink signal is transmitted to the base station in the foregoing embodiments by using an antenna. On downlink, the antenna receives the downlink signal transmitted by the base station in the foregoing embodiment. The transceiver 801 adjusts (for example, filters, amplifies, down-converts, and digitizes) a signal received from the antenna and provides input sampling. In the modem processor 804, an encoder 8041 receives service data and a signaling message that are to be sent on uplink, and processes (for example, formats, encodes, and interleaves) the service data and the signaling message. A modulator 8042 further processes (for example, performs symbol mapping and modulates) encoded service data and an encoded signaling message, and provides output sampling. A demodulator 8044 processes (for example, demodulates) the input sampling and provides a symbol estimation. A decoder 8043 processes (for example, de-interleaves and decodes) the symbol estimation and provides decoded data and a decoded signaling message that are to be sent to the UE. The encoder 8041, the modulator 8042, the demodulator 8044, and the decoder 8043 may be implemented by the integrated modem processor 804. These units perform processing based on a radio access technology (such as access technologies in an LTE system and other evolved systems) used in a radio access network.

The controller/processor 802 controls and manages actions of the UE and is configured to perform the processing performed by the UE in the foregoing embodiments, such as process the received positioning reference signal to obtain a positioning measurement result. In an example, the controller/processor 802 is configured to support the UE in performing contents related to the UE in FIG. 5 and FIG. 6. The memory 803 is configured to store program code and data that are used for the UE.

Figure 10:
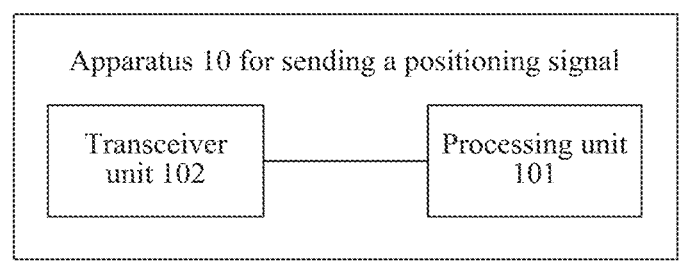
FIG. 10 is a schematic diagram of an apparatus for sending a positioning signal according to an embodiment of this application.

As shown in FIG. 10, an embodiment of this application further discloses an apparatus 10 for sending a positioning signal, where the apparatus 10 for sending a positioning signal includes:

a processing unit 101, configured to determine a first target access network used to transmit a positioning signal, where the first target access network includes at least one of a first access network and a second access network; and a transceiver unit 102, configured to send the positioning signal to a second device by using the first target access network.

In this embodiment of this application, the apparatus for sending the positioning signal is a terminal device or is located on a terminal device side, the second device is a network device or is located on a network device side, and the device maintains a connected state with the first access network and the second access network; or the apparatus for sending the positioning signal is a network device or is located on a network device side, the second device is a terminal device or is located on a terminal device side, and the second device maintains a connected state with the first access network and the second access network.

In this embodiment of this application, when determining the first target access network used to transmit the positioning signal, the processing unit 101 is specifically configured to: determine, when the first access network or the second access network satisfies a first condition, that the first target access network is the first access network or the second access network; and determine, when neither of the first access network and the second access network satisfies the first condition, that the first target access network is the first access network and the second access network, where the first condition includes at least one of: channel quality of an access network being greater than a first preset value, load of the access network being less than a second preset value, and a throughput of the access network being less than a third preset value.

In this embodiment of this application, when determining the first target access network used to transmit the positioning signal, the processing unit 101 is specifically configured to: determine the first target access network based on pre-configuration.

In this embodiment of this application, the positioning signal includes a positioning reference signal used for positioning measurement, and when sending the positioning signal to the second device by using the first target access network, the transceiver unit 102 is specifically configured to: send the positioning reference signal to the second device by using first duration as a period and by using the first access network when the first target access network is the first access network, where a bandwidth for sending the positioning reference signal is a first bandwidth; and/or send the positioning reference signal to the second device by using second duration as a period and by using the second access network when the first target access network is the second access network, where a bandwidth for sending the positioning reference signal is a second bandwidth. In this embodiment of this application, the positioning signal is control signaling used for positioning, or the positioning signal is a signal used for positioning measurement.

Figure 11:
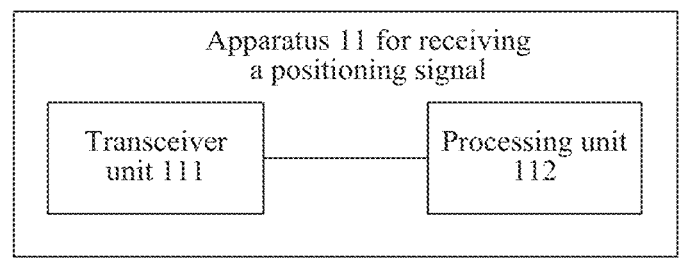
FIG. 11 is a schematic diagram of an apparatus for receiving a positioning signal according to an embodiment of this application.

As shown in FIG. 11, an embodiment of this application further provides an apparatus 11 for receiving a positioning signal, where the apparatus 11 for receiving a positioning signal includes:

a transceiver unit 111, configured to receive a positioning signal sent by a first device through a first target access network, where the first target access network is at least one of the first access network and the second access network; and a processing unit 112, configured to perform corresponding processing on the positioning signal.

In this embodiment of this application, the first device is a terminal device or is located on a terminal device side, the apparatus for receiving the positioning signal is a network device or is located on a network device side, and the first device maintains a connected state with the first access network and the second access network: or the first device is a network device, the apparatus for receiving the positioning signal is a terminal device or is located on a terminal device side, and the device for receiving a positioning reference signal maintains a connected state with the first access network and the second access network.

In this embodiment of this application, when the first access network or the second access network satisfies a first condition, the first target access network is the first access network or the second access network, and when neither of the first access network and the second access network satisfies the first condition, the first target access network is the first access network and the second access network, where the first condition includes at least one of: channel quality of an access network being greater than a first preset value, load of the access network being less than a second preset value, and a throughput of the access network being less than a third preset value.

In this embodiment of this application, the first target access network is determined by the first device based on preconfiguration.

In this embodiment of this application, the positioning signal is control signaling used for positioning, or the positioning signal is a signal used for positioning measurement.

In this embodiment of this application, when the first target access network includes the first access network and the second access network, and the positioning signal is a positioning reference signal used for positioning measurement, and when performing corresponding processing on the positioning signal the processing unit 112 is specifically configured to: determine a second target access network used to receive the positioning reference signal, where the second target access network includes at least one of the first access network and the second access network; receive, through the second target access network, the positioning reference signal sent by the first device; and obtain a positioning measurement result based on the received positioning reference signal.

In this embodiment of this application, when the second target access network includes the first access network and the second access network, the first access network corresponds to a first positioning reference signal, and the second access network corresponds to a second positioning reference signal, and when obtaining the positioning measurement result based on the received positioning reference signal, the processing unit 112 is specifically configured to: perform joint detection on the first positioning reference signal and the second positioning reference signal when the first positioning reference signal and the second positioning reference signal satisfy a second condition, to obtain the positioning measurement result; and detect the first positioning reference signal and the second positioning reference signal respectively when the first positioning reference signal and the second positioning reference signal do not satisfy the second condition, to obtain the positioning measurement result, where the second condition includes at least one of: phase of the first positioning reference signal and the second positioning reference signal being continuous and the first positioning reference signal and the second positioning reference signal being synchronous.

In this embodiment of this application, the positioning measurement result includes a first positioning measurement result and a second positioning measurement result, and when obtaining the positioning measurement result based on the received positioning reference signal, the processing unit 112 is specifically configured to: obtain the first positioning measurement result based on the first positioning reference signal and obtain the second positioning measurement result based on the second positioning reference signal when detecting the first positioning reference signal and the second positioning reference signal respectively.

In this embodiment of this application, the transceiver unit 111 is further configured to report the first measurement result and the second measurement result to the network device.

In this embodiment of this application, when obtaining the positioning measurement result based on the received positioning reference signal, the processing unit 112 is specifically configured to: obtain a first positioning measurement result based on the first positioning reference signal and obtain a second positioning measurement result based on the second positioning reference signal when detecting the first positioning reference signal and the second positioning reference signal respectively; and obtain the positioning measurement result based on the first positioning measurement result and the second positioning measurement result.

In this embodiment of this application, when obtaining the positioning measurement result based on the received positioning reference signal, the processing unit 112 is specifically configured to:

combine the first positioning reference signal and the second positioning reference signal when performing joint detection on the first positioning reference signal and the second positioning reference signal, to obtain a combined positioning reference signal: obtain a local positioning reference signal; and obtain the positioning measurement result based on the combined positioning reference signal and the local positioning reference signal.

In this embodiment of this application, the transceiver unit 111 is further configured to report the measurement result to the network device.

An embodiment of this application further discloses a computer-readable storage medium, including an instruction, where when run on a communications device, the instruction enables the communications device to perform any one of the methods for sending a positioning signal or the methods for receiving a positioning signal.

An embodiment of this application further discloses a chip. The chip is connected to a memory, and is configured to read and execute a software program stored in the memory, to implement any one of the methods for sending a positioning signal or the methods for receiving a positioning signal.

An embodiment of this application further provides an apparatus, including a processor and a memory, where the memory stores a program or an instruction, and when the program or the instruction is executed by the processor, any one of the methods for sending a positioning signal or the methods for receiving a positioning signal is implemented.

Method or algorithm steps described in combination with the content disclosed in the present invention may be implemented by using hardware, or may be implemented by a processor executing a software instruction. The software instruction may be formed by a corresponding software module. The software module may be stored in a RAM memory, a flash memory, a ROM memory, an EPROM memory, an EEPROM memory, a register, a hard disk, a removable hard disk, a CD-ROM, or a storage medium in any other form known in the art. For example, a storage medium is coupled to the processor, so that the processor can read information from the storage medium and can write information to the storage medium. Certainly, the storage medium may alternatively be a component of a processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, functions described in the present invention may be implemented by using hardware, software, firmware, or any combination thereof. When the functions are implemented by software, the functions may be stored in a computer readable medium or transmitted as one or more instructions or code in a computer readable medium. The computer readable medium includes a computer storage medium and a communications medium. The communications medium includes any medium that facilitates a computer program to be transmitted from one place to another. The storage medium may be any available medium accessible to a general-purpose or special-purpose computer.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A method for sending a positioning signal, comprising:
determining, by a first device, a first target access network useable to transmit the positioning signal, wherein the first target access network includes at least a first access network and a second access network; and
sending, by the first device, the positioning signal to a second device by the first target access network, wherein the positioning signal comprises a positioning reference signal (PRS) useable for positioning measurement; and sending, by the first device, the positioning reference signal to the second device through the second target access network; and
wherein the second target access network useable to receive the positioning reference signal is determined by the second device, wherein the second target access network includes the first access network and the second access network;
wherein a positioning measurement result is obtained, by the second device, based on the received positioning reference signal.

2. The method according to claim 1, wherein
the first device is a terminal device, the second device is a network device, and the terminal device is configured to maintain a connected state with the first access network and the second access network; or
the first device is the network device, the second device is the terminal device, and the terminal device is configured to maintain the connected state with the first access network and the second access network.

3. The method according to claim 1, wherein the determining, by the first device, the first target access network useable to transmit the positioning signal comprises:
determining, by the first device, that the first target access network includes the first access network or the second access network in response to the first access network or the second access network satisfying a first condition; and
determining, by the first device, that the first target access network includes the first access network and the second access network in response to the first access network and the second access network failing to satisfy the first condition,
wherein the first condition includes at least a channel quality of an access network being greater than a first preset value, a load of the access network being less than a second preset value, or a throughput of the access network being less than a third preset value.

4. The method according to claim 1, wherein the determining, by the first device, the first target access network useable to transmit the positioning signal comprises:
determining, by the first device, the first target access network based on a pre-configuration setting.

5. The method according to claim 4, wherein the pre-configuration setting includes a pre-configured protocol setting.

6. The method according to claim 1, wherein
the sending, by the first device, the positioning signal to the second device by the first target access network includes at least:
sending, by the first device, the positioning reference signal to the second device by the first access network, when the first target access network includes at least the first access network, wherein a bandwidth for sending the positioning reference signal is a first bandwidth, and a period for sending the positioning reference signal is a first duration; or
sending, by the first device, the positioning reference signal to the second device by the second access network, when the first target access network includes at least the second access network, wherein the bandwidth for sending the positioning reference signal is a second bandwidth, and the period for sending the positioning reference signal is a second duration.

7. The method according to claim 1, wherein the positioning signal includes:
control signaling useable for positioning, or
a signal useable for positioning measurement.

8. A method for receiving a positioning signal, comprising:
receiving, by a second device, the positioning signal from a first device through a first target access network, wherein the first target access network includes at least a first access network and a second access network; and
performing, by the second device, processing on the positioning signal,
wherein the positioning signal comprises a positioning reference signal (PRS) useable for positioning measurement; and
wherein the performing, by the second device, processing on the positioning signal comprises:
determining, by the second device, a second target access network useable to receive the positioning reference signal, wherein the second target access network includes the first access network and the second access network;
receiving, by the second device, the positioning reference signal from the first device through the second target access network; and
obtaining, by the second device, a positioning measurement result based on the received positioning reference signal.

9. The method according to claim 8, wherein
the first device is a terminal device, the second device is a network device, and the terminal device is configured to maintain a connected state with the first access network and the second access network; or
the first device is the network device, the second device is the terminal device, and the terminal device a is configured to maintain the connected state with the first access network and the second access network.

10. The method according to claim 8, wherein
the first target access network includes the first access network or the second access network in response to the first access network or the second access network satisfying a first condition; and
the first target access network includes the first access network and the second access network in response to the first access network and the second access network failing to satisfy the first condition;
wherein the first condition includes at least a channel quality of an access network being greater than a first preset value, a load of the access network being less than a second preset value, or a throughput of the access network being less than a third preset value.

11. The method according to claim 8, wherein the first target access network is determined based on a pre-configuration setting.

12. The method according to claim 8, wherein the positioning signal includes:
control signaling useable for positioning, or
a signal useable for positioning measurement.

13. An apparatus, comprising:
one or more processors, and
a non-transitory storage medium coupled to the one or more processors, and configured to store programmable instructions;
wherein, when executed by the one or more processors, the programmable instructions cause the apparatus to:
determine a first target access network useable to transmit a positioning signal, wherein the first target access network includes at least a first access network and a second access network; and send the positioning signal to a second device by the first target access network, wherein the positioning signal comprises a positioning reference signal (PRS) useable for positioning measurement; and send the positioning reference signal to the second device through the second target access network; and wherein the second target access network useable to receive the positioning reference signal is determined by the second device, wherein the second target access network includes the first access network and the second access network;

wherein a positioning measurement result is obtained, by the second device, based on the received positioning reference signal.

14. The apparatus according to claim 13, wherein the apparatus is a terminal device, the second device is a network device and the terminal device is configured to maintain a connected state with the first access network and the second access network; or the apparatus is the network device, the second device is the terminal device, and the second device is configured to maintain the connected state with the first access network and the second access network.

15. The apparatus according to claim 13, wherein the programmable instructions that cause the apparatus to determine the first target access network useable to transmit the positioning signal includes further instructions that further cause the apparatus to:

determine that the first target access network includes the first access network or the second access network in response to the first access network or the second access network satisfying a first condition; and determine that the first target access network includes the first access network and the second access network in response to the first access network and the second access network failing to satisfy the first condition, wherein the first condition includes at least a channel quality of an access network being greater than a first preset value, a load of the access network being less than a second preset value, or a throughput of the access network being less than a third preset value.

16. The apparatus according to claim 13, wherein the programmable instructions that cause the apparatus to determine the first target access network useable to transmit the positioning signal includes further instructions that further cause the apparatus to:

determine the first target access network based on a pre-configuration setting.

17. The apparatus according to claim 16, wherein the pre-configuration setting includes a pre-configured protocol setting.

18. The apparatus according to claim 13, wherein the programmable instructions that cause the apparatus to send the positioning signal to the second device by the first target access network includes further instructions that further cause the apparatus to at least:

send the positioning reference signal to the second device by the first access network, when the first target access network includes at least the first access network, wherein a bandwidth to send the positioning reference signal is a first bandwidth, and a period to send the positioning reference signal is a first duration; or send the positioning reference signal to the second device by the second access network, when the first target access network includes at least the second access network, wherein the bandwidth to send the positioning reference signal is a second bandwidth, and the period to send the positioning reference signal is a second duration.

19. The apparatus according to claim 13, wherein the positioning signal includes:

control signaling useable for positioning, or a signal useable for positioning measurement.

* * * * *